United States Patent [19]

Satchwell, III

[11] Patent Number: 5,749,436
[45] Date of Patent: May 12, 1998

[54] COLLAPSIBLE RAILING FOR MOUNTING ON A VEHICLE ROOF

[76] Inventor: Thomas Erwin Satchwell, III, 1036 LaSalle St., Jacksonville, Fla. 32207

[21] Appl. No.: 567,910

[22] Filed: Dec. 6, 1995

[51] Int. Cl.$^6$ .................................................. E06C 5/00
[52] U.S. Cl. ............................ 182/127; 296/3; 224/321; 211/195; 182/113
[58] Field of Search .......................... 182/18, 113, 127; 211/182, 195, 201; 296/3; 224/314, 320, 321; 248/292.12, 505

[56] References Cited

U.S. PATENT DOCUMENTS

| | | | |
|---|---|---|---|
| 1,506,422 | 8/1924 | Gibbons | 296/3 |
| 2,066,984 | 1/1937 | Lamb | 182/113 |
| 2,387,779 | 10/1945 | Strauss | 224/314 |
| 3,002,664 | 10/1961 | Guevara | 224/314 |
| 4,521,048 | 6/1985 | Prvanoff | 296/160 |
| 4,613,155 | 9/1986 | Greenwood | 280/760 |
| 5,069,309 | 12/1991 | Swiderski et al. | 182/113 X |
| 5,154,256 | 10/1992 | Wood | 182/113 |
| 5,213,367 | 5/1993 | Norman et al. | 182/127 X |

FOREIGN PATENT DOCUMENTS

| | | | |
|---|---|---|---|
| 515957 | 12/1952 | Belgium | 224/314 |
| 3719974 | 12/1987 | Germany | 224/314 |
| 558145 | 2/1957 | Italy | 224/314 |

*Primary Examiner*—Leslie A. Braun
*Assistant Examiner*—Stephen S. Wentsler

[57] ABSTRACT

The present invention includes a railing and a plurality of collapsible stanchions having an upper end and a lower end. A hinge connected to each upper end for pivotally coupling with the railing. The lower end also has a hinge connected thereto for pivotally coupling with a roof of a vehicle. At least one of the hinges has a locking mechanism to preclude pivoting of the stanchions.

3 Claims, 3 Drawing Sheets

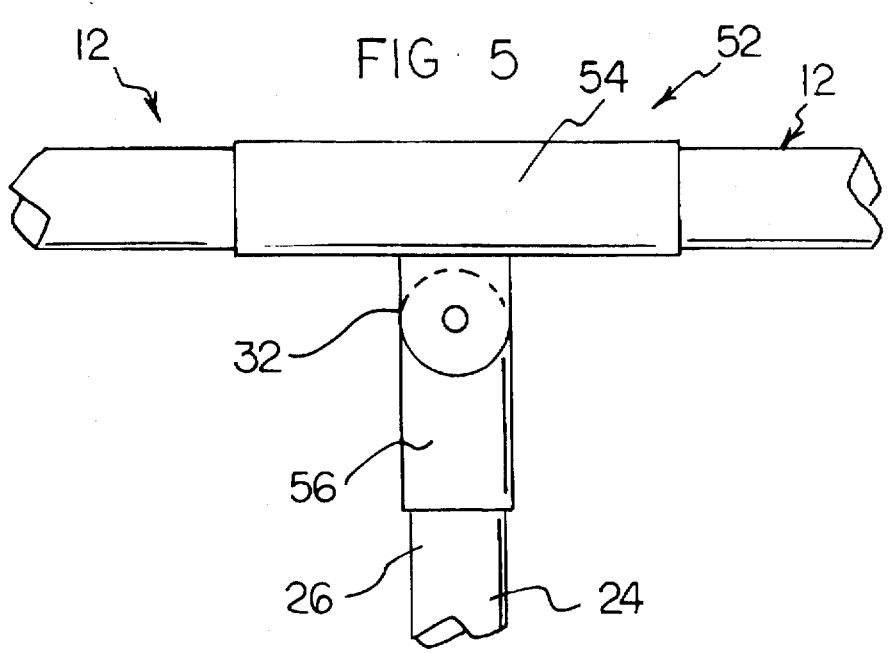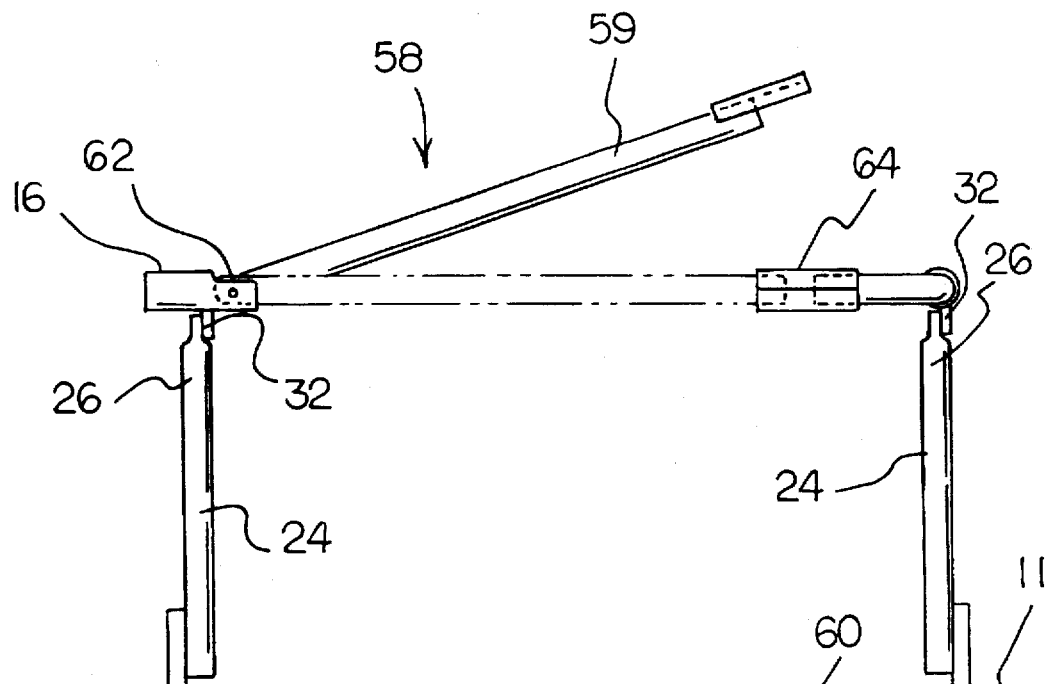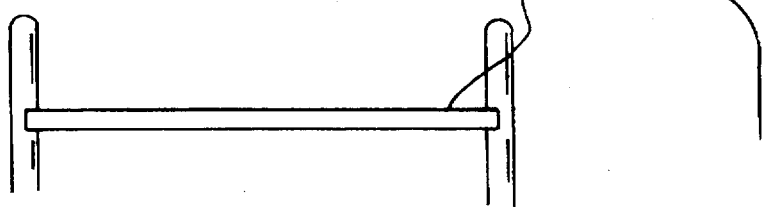

COLLAPSIBLE RAILING FOR MOUNTING ON A VEHICLE ROOF

BACKGROUND OF THE INVENTION

1. Field of the Invention

The present invention relates to a railing for mounting on a vehicle roof and more particularly pertains to providing a safety measure for persons aboard a vehicle roof.

2. Description of the Prior Art

The use of rooftop railings is known in the prior art. More specifically, rooftop railings heretofore devised and utilized for the purpose of containing items on a vehicle roof are known to consist basically of familiar, expected and obvious structural configurations, notwithstanding the myriad of designs encompassed by the crowded prior art which have been developed for the fulfillment of countless objectives and requirements.

By way of example, the prior art discloses such rooftop railings in U.S. Pat. No. 4,036,520 to Zuidema; U.S. Pat. No. 4,317,590 to Young; U.S. Pat. No. 4,463,982 to Irelan; U.S. Pat. No. 4,465,316 to Roisen; and U.S. Pat. No. 4,979,725 to Huthings, II et al.

In this respect, the collapsible railing for mounting on a vehicle roof according to the present invention substantially departs from the conventional concepts and designs of the prior art, and in so doing provides an apparatus primarily developed for the purpose of providing a safety measure for persons aboard a vehicle roof.

Therefore, it can be appreciated that there exists a continuing need for a new and improved collapsible railing for mounting on a vehicle roof which can be used for providing a safety measure for persons aboard a vehicle roof. In this regard, the present invention substantially fulfills this need.

SUMMARY OF THE INVENTION

In view of the foregoing disadvantages inherent in the known types of rooftop railings now present in the prior art, the present invention provides an improved collapsible railing for mounting on a vehicle roof. As such, the general purpose of the present invention, which will be described subsequently in greater detail, is to provide a new and improved collapsible railing for mounting on a vehicle roof apparatus and method which has all the advantages of the prior art and none of the disadvantages.

To attain this, the present invention essentially comprises a generally rectangular railing including a tubular rod with a linear rear section, arcuate front section, and a pair of linear side sections defining an interior space. A plurality of collapsible stanchions have an upper end and a lower end. Each lower end comprises a base mounted to the roof of the vehicle and pivots allowing the stanchion to collapse. A plurality of generally T-shaped sleeve joints have a horizontal upper sleeve secured about the railing and a lower sleeve pivotally coupled to the upper sleeve and secured about the upper end of the stanchions. A ladder access section comprises a portion of the railing adjacent to a ladder coupled to the vehicle. The ladder access section is hingably coupled at a first end to a sleeve joint and releasably coupled at a second end to a sleeve. The ladder access section further has an upright orientation for allowing access to the interior space of the railing and a prone orientation for precluding access thereto. At least one of the pivots comprises a locking hinge having a first orientation for allowing the stanchions and railing to swivel between an upright and collapsed position and a second orientation for precluding swiveling thereof.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved collapsible railing for mounting on a vehicle roof which has all the advantages of the prior art rooftop railings and none of the disadvantages.

It is another object of the present invention to provide a new and improved collapsible railing for mounting on a vehicle roof which may be easily and efficiently manufactured and marketed.

It is a further object of the present invention to provide a new and improved collapsible railing for mounting on a vehicle roof which is of a durable and reliable construction.

An even further object of the present invention is to provide a new and improved collapsible railing for mounting on a vehicle roof which is susceptible of a low cost of manufacture with regard to both materials and labor, and which accordingly is then susceptible of low prices of sale to the consuming public, thereby making such collapsible railings economically available to the buying public.

Still yet another object of the present invention is to provide a new and improved collapsible railing for mounting on a vehicle roof which provides in the apparatuses and methods of the prior art some of the advantages thereof, while simultaneously overcoming some of the disadvantages normally associated therewith.

Still another object of the present invention is to provide a safety measure for persons aboard a vehicle roof.

Lastly, it is an object of the present invention to provide a new and improved collapsible railing for mounting on a roof of a vehicle including a railing and a plurality of collapsible stanchions having an upper end and a lower end. Each upper end has a hinge connected thereto for pivotally coupling with the railing. The lower end also has a hinge connected thereto for pivotally coupling with the roof of a vehicle. At least one of the hinges has a locking mechanism to preclude pivoting of the stanchions.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there is illustrated preferred embodiments of the invention.

BRIEF DESCRIPTION OF THE DRAWINGS

The invention will be better understood and the objects other than those set forth above will become apparent when consideration is given to the following detailed description thereof. Such description makes reference to the annexed drawings wherein:

FIG. 5 is an enlarged side view of the sleeve joint encircled in FIG. 1.

FIG. 6 is an enlarged rear view of the ladder access section of the present invention as encircled in FIG. 2.

Similar reference characters refer to similar parts several views of the drawings.

DESCRIPTION OF THE PREFERRED EMBODIMENT

Figure 1:
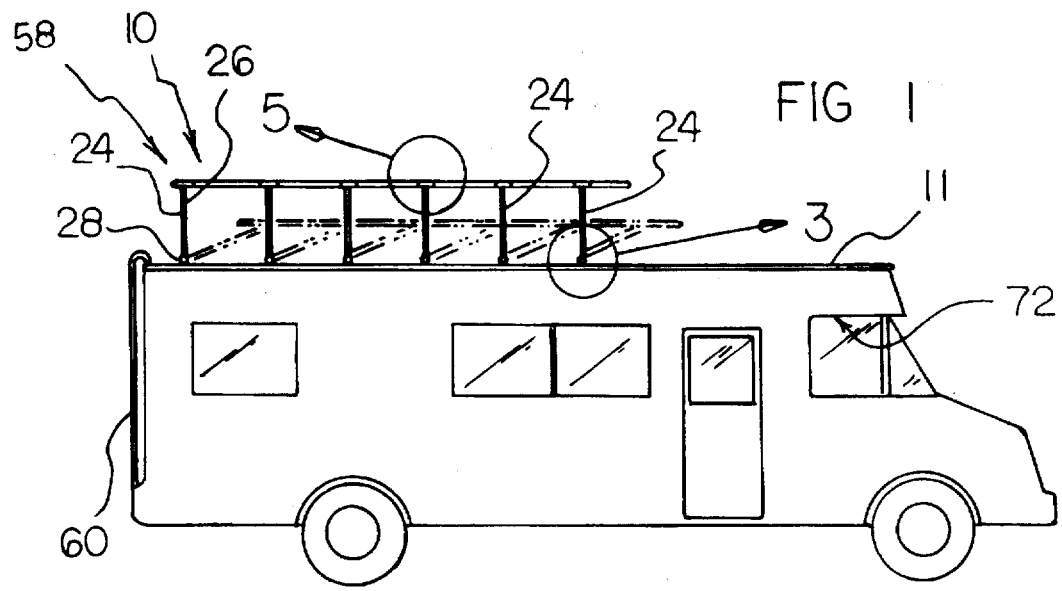
FIG. 1 is a plan illustration of the preferred embodiment of the collapsible railing for mounting on a vehicle roof constructed in accordance with the principles of the present invention.
Figure 2:
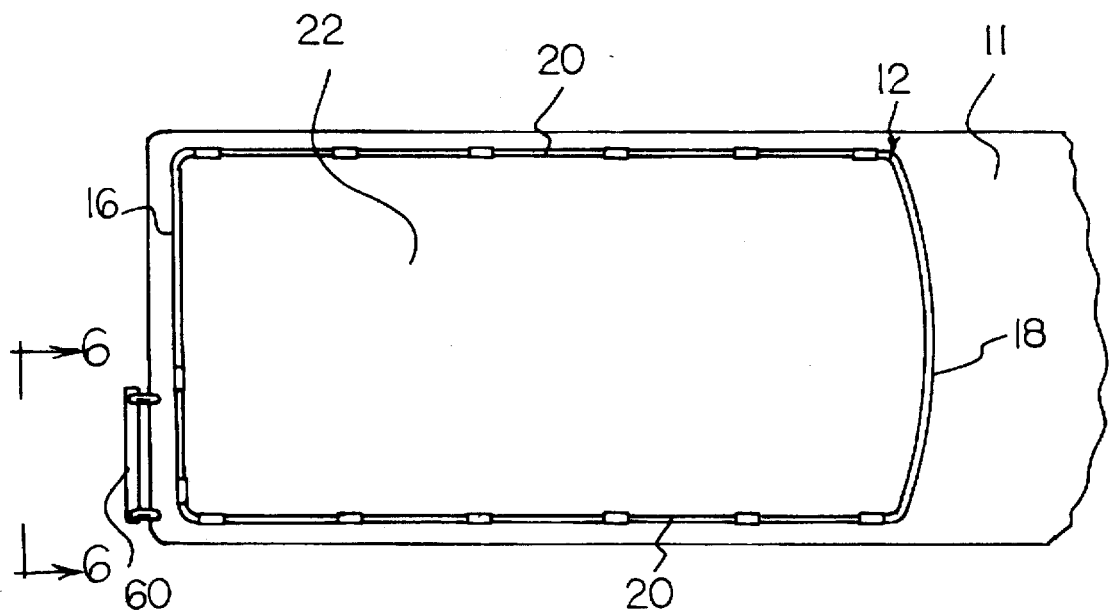
FIG. 2 is a plan top view of the present invention constructed in accordance with the principles of the present invention.
Figure 3:
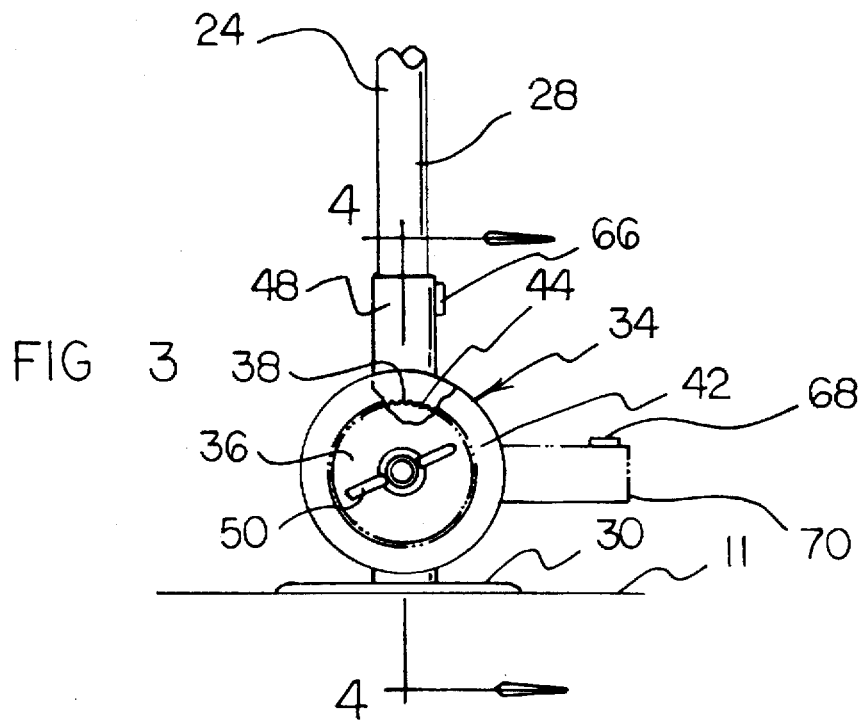
FIG. 3 is an enlarged side view of the locking hinge encircled in FIG. 1.
Figure 4:
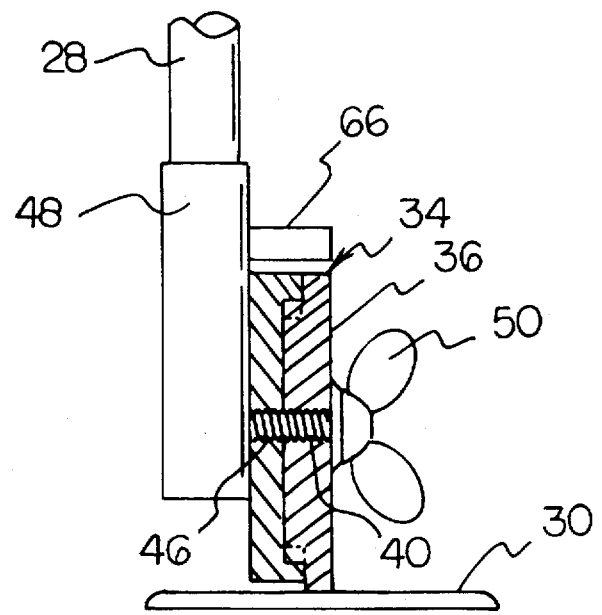
FIG. 4 is an enlarged cross-sectional side view of the locking hinge encircled in FIG. 1 and taken along the line 4—4 in FIG. 3.

With reference now to the drawings, and in particular to FIG. 1 thereof, a new and improved collapsible railing for mounting on a vehicle roof embodying the principles and concepts of the present invention and generally designated by the reference numeral 10 will be described.

The present invention, the new and improved collapsible railing for mounting on a vehicle roof 11, is comprised of a plurality of components. Such components in their broadest context include a railing, collapsible stanchions, locking hinge, and ladder access section. Such components are individually configured and correlated with respect to each other so as to attain the desired objective.

More specifically, it will be noted that system 10 of the present invention includes a generally rectangular railing 12. The railing includes a tubular rod with a linear rear section 16, arcuate front section 18, and a pair of linear side sections 20 defining an interior space 22. The tubular rod is preferably formed of a durable metal such as aluminum or stainless steel but can also be constructed of a rigid plastic material. The railing is sized to coincide with the periphery of a vehicle roof.

Further included is a plurality of collapsible stanchions 24. Each stanchion has an upper end 26 and a lower end 28. The lower end 28 comprise a base 30 mounted to the vehicle roof 11 and a plurality of pivots 32 allowing each stanchion to collapse. The length of the stanchion ranges between approximately 36 inches to 42 inches.

The pivots 32 consist of conventional hinges. For locking purposes, at least one of the pivots comprises a locking hinge 34 having a circular first portion 36 with a plurality of teeth 38 formed in an exterior periphery thereof and a threaded aperture 40 centrally disposed therein. The first portion 36 is coupled to the base 30. A circular second portion 42 has a plurality of teeth 44 formed in an interior periphery thereof and a threaded aperture 46 centrally disposed therein. The second portion includes a sleeve 48 coupled thereto for securing about the lower end 28 of the stanchion. Finally, a wing bolt 50 is included for inserting within the threaded apertures. The wing bolt has a first disengaged orientation for allowing the disengagement of the teeth and an inserted orientation for allowing the engagement thereof.

Also included is a plurality of generally T-shaped sleeve joints 52. Each sleeve joint has a horizontal upper sleeve 54 secured about the railing 12 and further a lower sleeve 56 pivotally coupled to the upper sleeve 54 and secured about the upper end 26 of the stanchion 24. The sleeve joint employs a conventional hinge for pivotally coupling the lower sleeve to the upper sleeve.

For providing access to the interior space of the railing, further included is a ladder access section 58 comprising a portion 59 of the railing adjacent a ladder 60 coupled to the vehicle. The ladder access section 58 is hingably coupled at a first end to a sleeve joint 62 and releasably coupled at a second end to a sleeve 64. The ladder access section has an upright orientation for allowing access to the interior space of the railing and a prone orientation for precluding access thereto.

As an added safety feature, a safety switch is included comprising a pair of contacts. The contacts include a first contact 66 situated on the sleeve 48 a radial distance from the locking hinge 34. Further included is a second contact 68 situated on a top surface of a rod portion 70 extending horizontally a radial distance from the locking hinge. The safety switch has a first closed orientation upon the collapse of the railing whereby the contacts abut. A second open orientation is defined by the contacts being separated. The safety switch is adapted to actuate an alarm 72 situated within the vehicle when the vehicle is moving and the switch is in an open orientation thus preventing a collision with a bridge or low clearance path of travel.

Operation and use of the collapsible railing is facilitated by the amalgamation of the foregoing components. To ensure securement of the railing to the roof of the vehicle, each base can either be bolted or adhered thereto with an adhesive. In use, the wing bolt may be disengaged thereby allowing the railing to be swiveled into an upright position. Upon erection, the wing bolt may be inserted thereby precluding the railing from collapsing. After use and during motion of the vehicle, the wing bolt may be disengaged thereby allowing the railing to be swiveled into a collapsed position. The wing bolt may then be inserted for precluding movement of the railing during travel.

The present invention provides a safety measure for persons or objects on a vehicle roof. The height of the railing is ideally tailored to prevent persons or objects from falling thus allowing the roof of the automobile to be utilized as a patio or vantage point. To comply with height restrictions of many highways, the instant invention employs a collapsing feature to be used when the vehicle is in motion.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new and improved collapsible railing comprising, in combination:

a vehicle with a roof;

a generally rectangular railing including a tubular rod with a linear rear section, an arcuate front section, and a pair of linear side sections defining an interior space;

a plurality of collapsible stanchions, each of the stanchions having an upper end and a lower end, the lower end comprising a base mounted to the roof of the vehicle and a pivotal means allowing each of the stanchions to collapse;

a plurality of generally T-shaped sleeve joints, each of the sleeve joints having a horizontal upper sleeve secured about the railing and a lower sleeve pivotally coupled to the upper sleeve and secured about the upper end of the corresponding stanchion; and a ladder access section comprising a portion of the railing adjacent to a ladder coupled to the vehicle, the ladder access section hingably coupled at a first end to a sleeve joint and releasably coupled at a second end to a sleeve, the ladder access section further having an upright orientation for allowing access to the interior space of the railing and a prone orientation for precluding access thereto;

wherein at least one of the pivotal means comprises a locking hinge having a circular first portion with a plurality of teeth formed in an exterior periphery thereof and a threaded aperture centrally disposed therein, the first portion coupled to the base of the stanchion; a circular second portion with a plurality of teeth formed in an interior periphery thereof and a threaded aperture centrally disposed therein, the second portion having a sleeve coupled thereto for securing about the lower end of the stanchion; and a wing bolt for inserting within the threaded apertures and having a first disengaged orientation for allowing disengagement of the teeth thereby allowing the stanchions and railing to swivel between an upright and collapsed position, the wing bolt further having an inserted orientation for allowing engagement of the teeth thereby precluding the stanchions and railing from swiveling between the upright and collapsed position.

2. A collapsible railing comprising, in combination a vehicle with a roof;

a railing;

a plurality of collapsible stanchions having an upper end and a lower end, the upper end having a pivotal coupling means connected thereto for pivotally coupling with the railing, the lower end having a pivotal coupling means connected thereto for pivotally coupling with a roof of a vehicle, wherein at least one of the pivotal coupling means comprises a locking hinge having a circular first portion with a plurality of teeth formed in an exterior periphery thereof and a threaded aperture centrally disposed therein, the first portion coupled to the base of the stanchion; a circular second portion with a plurality of teeth formed in an interior periphery thereof and a threaded aperture centrally disposed therein, the second portion having a sleeve coupled thereto for securing about the lower end of the stanchion; and a wing bolt for inserting within the threaded apertures and having a first disengaged orientation for allowing disengagement of the teeth thereby allowing the stanchions and railing to swivel between an upright and collapsed position, the wing bolt further having an inserted orientation for allowing engagement of the teeth thereby precluding the stanchions and railing from swiveling between the upright and collapsed position; a ladder access section comprising a portion of the railing adjacent to the ladder coupled to the vehicle, the ladder access section hingably coupled at a first end to a sleeve joint and releasably coupled at a second end to a sleeve, the ladder access section further having an upright orientation for allowing access to the interior space of the railing and a prone orientation for precluding access thereto; and a safety switch including a first contact situated on the sleeve radial distance from the locking hinge and a second contact situated on a top surface of a rod portion extending horizontally a radial distance from the locking hinge, the contacts having a first closed orientation upon the collapse of the railing wherein the contacts abut and further a second open orientation whereby the safety switch is adapted to actuate an alarm when the vehicle is moving and the switch is in the open orientation.

3. A new and improved collapsible railing for mounting on a roof of a vehicle comprising, in combination:

a vehicle with a roof;

a generally rectangular railing including a tubular rod with a linear rear section, an arcuate front section, and a pair of linear side sections defining an interior space;

a plurality of collapsible stanchions, each of the stanchions having an upper end and a lower end, the lower end comprising a base mounted to the roof of the vehicle and a pivotal means allowing each of the stanchions to collapse;

a plurality of generally T-shaped sleeve joints, each of the sleeve joints having a horizontal upper sleeve secured about the railing and a lower sleeve pivotally coupled to the upper sleeve and secured about the upper end of the corresponding stanchion; and a ladder access section comprising a portion of the railing adjacent to a ladder coupled to the vehicle, the ladder access section hingably coupled at a first end to a sleeve joint and releasably coupled at a second end to a sleeve, the ladder access section further having an upright orientation for allowing access to the interior space of the railing and a prone orientation for precluding access thereto.

* * * * *